Dec. 12, 1944.  I. C. TYLER  2,365,026
SEAT AND THE LIKE
Filed Feb. 25, 1943
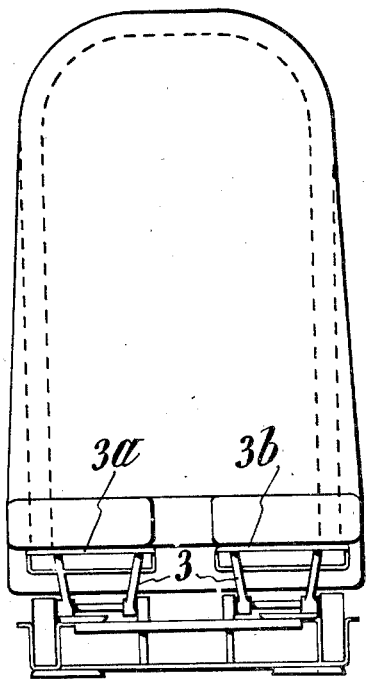
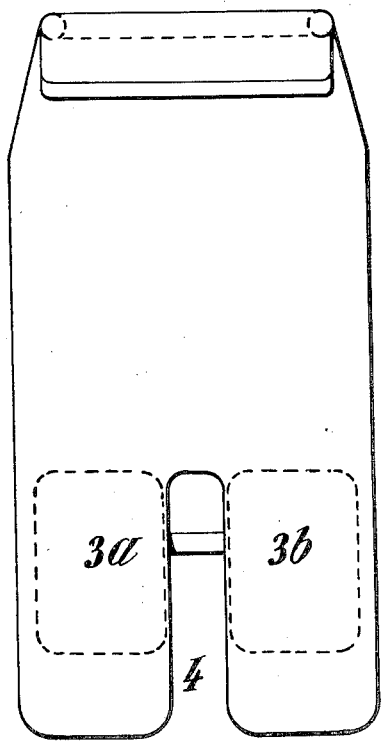
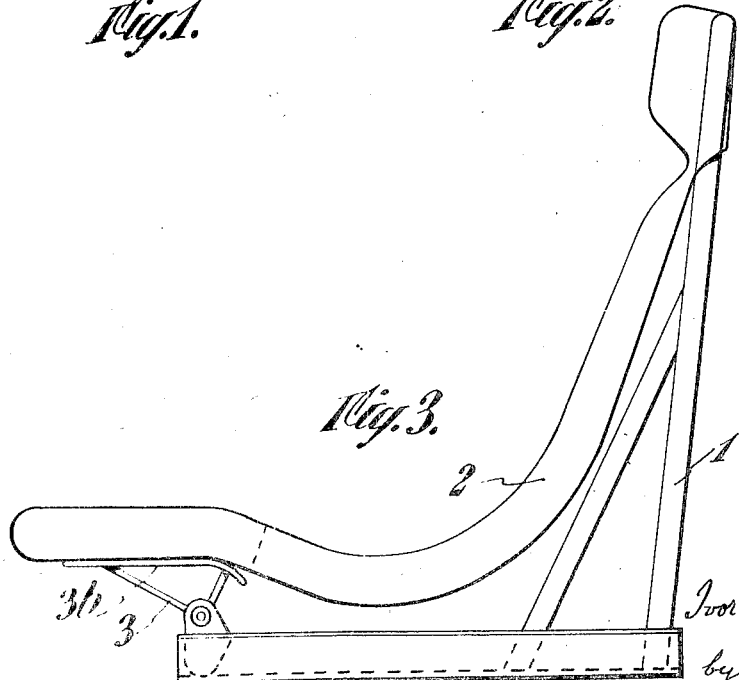

UNITED STATES PATENT OFFICE 2,365,026

SEAT AND THE LIKE

Ivor Charles Tyler, Hill Farm, Thursley, England, assignor to Harris & Tyler Limited, Watford, Hertfordshire, England, a company of Great Britain Application February 25, 1943, Serial No. 477,112
In Great Britain March 18, 1941

4 Claims. (Cl. 244—122)

This invention relates to improvements in seats and the like of the kind comprising a flexible element slung between front and rear anchorages and providing a combined seat and back rest for support.

I have found that in a pilot's seat of an aircraft it is convenient to divide a seat longitudinally to provide a passage or entry for the control stick and to permit each component part of the divided seat to have independent movement relatively one to the other.

According to this invention therefore the seat comprises a frame member and a flexible seat member, a front anchorage and a rear anchorage connecting said frame member and said seat member, said front anchorage being pivoted to said frame and divided into two independently movable parts and said seat member being divided longitudinally for a part of its length to provide two complementary parts forming between them a passageway extending from the front of the seat to a point inwardly thereof.

With the construction in accordance with the invention independent movement of each component part of the seat may take place upon movement of the legs of the user of the seat, for example, when using the rudder bar of an aircraft and at the same time it is possible to move the joy stick towards the rear along the passageway or slot described. The entrance to the passageway may be widened or opened out to facilitate to the entry movement of the joy stick of the aircraft.

In order that the invention may be clearly understood, reference is directed to the accompanying drawing wherein:

Figure 1 is a front elevation of a seat embodying improvements in accordance with the invention.

Figure 2 is a plan view of a flexible element, and

Figure 3 is a side elevation of Figure 1.

In the preferred construction illustrated in the drawing the seat comprises a frame I having an upper, rear portion which supports a flexible element 2 constituting the seat extending downwardly and then forwardly to a front anchorage constituted by a pair of laterally arranged members 3 that underlie the thigh-supporting sections of the flexible seat element 2 and are pivotally supported on the frame for rocking movement about an axis parallel to, and somewhat below and to the rear of, the front edge of the seat. The rear portions of the upper surfaces of each of the pivoted members 3 are curved downwardly to afford a support for the flexible seat element 2 that avoids any sharp break in the contour of the flexible element 2 when the pivoted members 3 are rocked on their pivots as the occupant of the seat moves his legs up and down. The pivoted members 3 provide left-hand and right-hand components 3a, 3b, and the flexible element 2 is similarly and complementarily divided to provide a passageway 4 extending from the front of the seat to a point inwardly thereof, i. e., to a point beyond the back edge of the thigh-rest plates, and to such a position between there and the pelvic bone of the user as is necessitated by the maximum up and down movement of either leg, which would of course vary according to the relative positions of the seat surface and member upon which the feet of the user rest. The pair of members 3a, 3b, are pivotally supported and may be associated with the pivoted front anchorages to maintain the same in a predetermined neutral position and to impose resistance to pivotal movement of the anchorage in at least one direction out of said neutral position.

It will be appreciated that the invention provides an improved construction of seat for use on aeroplanes where it is necessary for comfort and utility to provide an independent support and movement for aircraft pilot's legs having regard to the movement of the rudder bar where one leg is tensioned and the other is flexed. Although the invention has been described more especially for aircraft seats, the usefulness of the invention applies equally to motor-car driver's seats, and in fact any other seat where the user has an operational function requiring independent leg movement.

What I claim and desire to secure by Letters Patent is:

1. In a seat, a frame having an upper rear portion, a pair of laterally arranged thigh-supporting members pivoted on said frame for rocking movement about an axis parallel to the front edge of the seat, and a flexible seat member suspended between said upper portion of the frame and said supporting members, the lower forward portion of said flexible seat member being split longitudinally to permit individual rocking movement of said thigh-supporting members and the associated split portions of the flexible seat member in response to pressure exerted on said supporting member by the legs of the occupant of the seat.

2. A seat comprising a frame having an upper rear portion, a pair of laterally arranged members individually pivoted upon said frame for rocking movement about an axis parallel to the front edge of the seat in response to pressure exerted upon the same by the occupant of the seat, and a flexible seat member suspended between the upper rear portion of said frame and said laterally arranged members, the lower front portion of said flexible seat member being longitudinally split to permit individual rocking movements of said pivoted members and the associated portions of the seat member.

3. A seat as recited in claim 2 wherein said pivoted members are laterally spaced to provide a passageway in which an aeroplane control element is movable.

4. A seat as recited in claim 2 wherein said flexible seat member is of such length that an intermediate portion thereof drops below the level of said pivoted members, and the rear ends of said pivoted members are curved downwardly.

IVOR CHARLES TYLER.